Oct. 16, 1923.

D. IACOBACCI 1,471,162

MULTIPLE SPEED DRIVE MECHANISM

Filed Oct. 11, 1920

3 Sheets-Sheet 1

Fig. 1.

Inventor

Domenico Iacobacci by Thurston Kwis & Hudson
attys.

Oct. 16, 1923.

D. IACOBACCI 1,471,162

MULTIPLE SPEED DRIVE MECHANISM

Filed Oct. 11, 1920  3 Sheets-Sheet 3

Inventor
Domenico Iacobacci
by Thurston, Kwis & Hudson
Attys.

Patented Oct. 16, 1923.

1,471,162

UNITED STATES PATENT OFFICE.

DOMENICO IACOBACCI, OF CLEVELAND, OHIO.

MULTIPLE-SPEED DRIVE MECHANISM.

Application filed October 11, 1920. Serial No. 415,976.

*To all whom it may concern:*

Be it known that I, DOMENICO IACOBACCI, a subject of the King of Italy, residing at Cleveland, in the county of Cuyahoga and State of Ohio, have invented a certain new and useful Improvement in Multiple-Speed Drive Mechanism, of which the following is a full, clear, and exact description.

This invention relates to a multiple speed drive mechanism for machine tools and has for its object the provision of a drive mechanism by which a variety of different speeds are obtainable through the shifting of a single driving gear into engagement with any one of a number of gears of varying size.

Further the invention aims to provide simply an efficient shifting mechanism for this movable gear, together with means by which it is readily lifted out of and into engagement with any particular gear prior to or after it is shifted along the spindle or shaft on which it is mounted.

Figure 2:
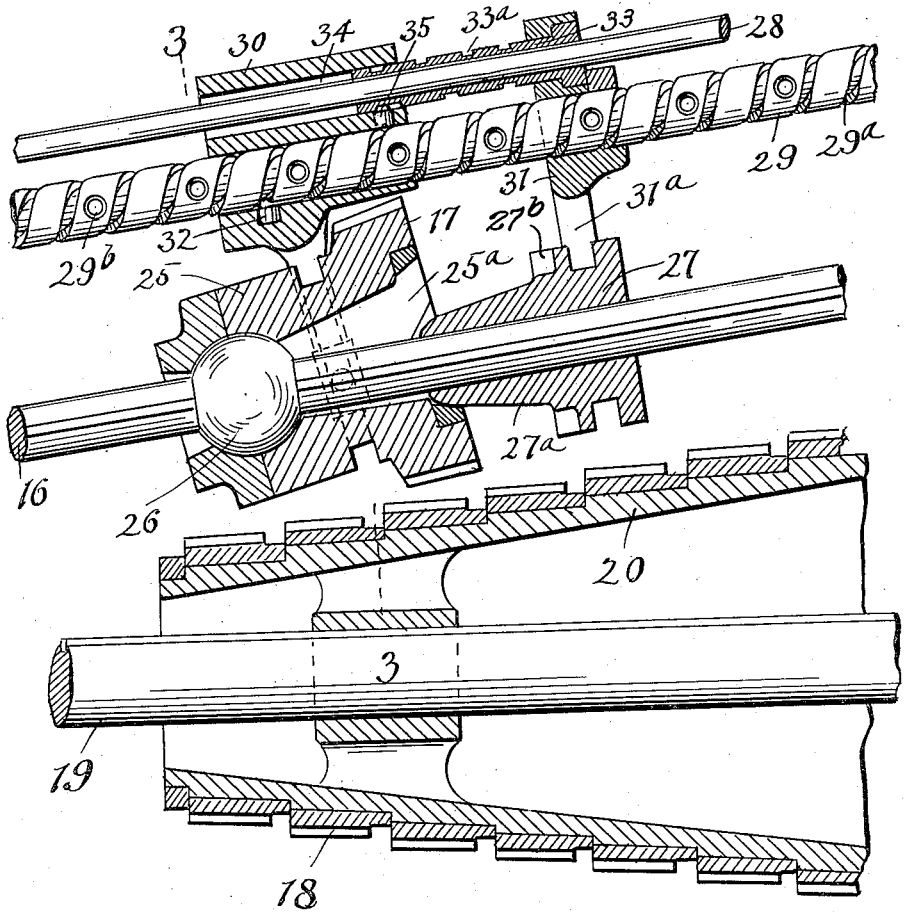
Figure 3:
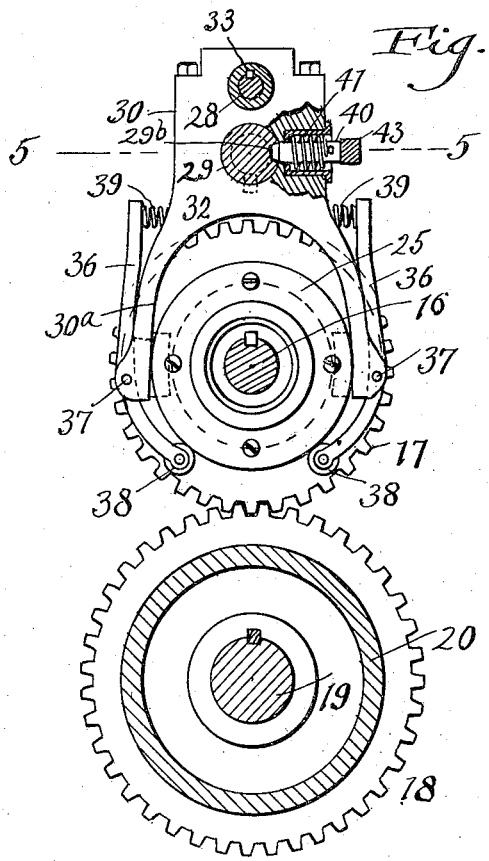
Figure 4:
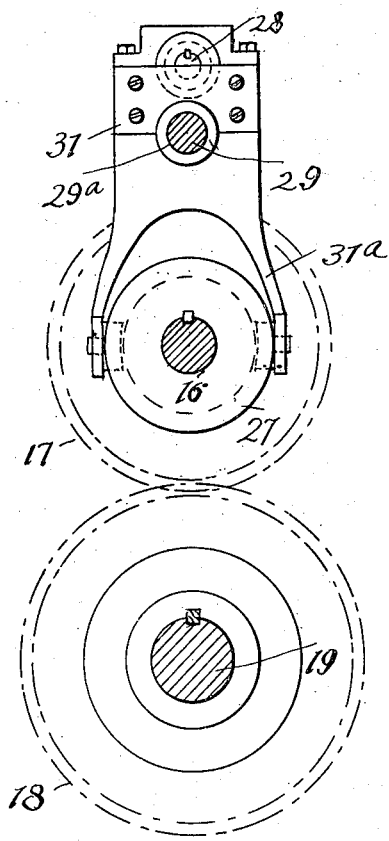
Figure 5:
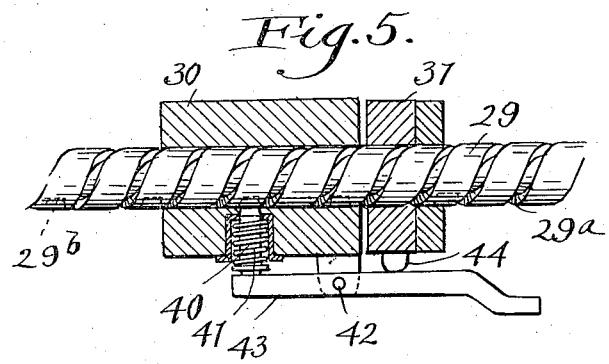

In the accompanying sheet of drawings wherein I have shown an embodiment of the invention which operates with high efficiency, Fig. 1 is a side view of the mechanism with parts in section; Fig. 2 is an enlarged sectional view showing the shiftable driving gear and the different gears which it is adapted to engage and the shifting mechanism; Fig. 3 is a sectional view substantially along the line 3—3 of Fig. 1 looking in the direction indicated by the arrows; Fig. 4 is a sectional view substantially along the line 4—4 of Fig. 1 looking in the direction indicated by the arrow; and Fig. 5 is a sectional view substantially along the line 5—5 of Fig. 3.

Referring now to the drawings, 10 represents a frame constituting the support for the mechanism of this invention, which mechanism includes a driving shaft 11, which can be driven in either direction by a belt or gear driven shaft 12 through a bevel gear 13 on the end of the shaft and either of two bevel gears 14 on the driving shaft 11 and shiftable selectively by any suitable means into engagement with the gear 13.

The shaft 11 is adapted to drive through bevel gearing 15 a shaft 16 and a shiftable gear 17 which is adapted to be moved into driving engagement with any one of a series of gears 18 on a driven shaft 19, the shaft 16 being shown inclined with reference to the shaft 19 so as to enable the gear 17 to mesh with any of the varying sizes of gears 18, any number of which may be provided. The gears 18 may be in the form of rings or annuli preferably mounted on a conical head 20 keyed to the shaft 19. It will be understood that by reason of the fact that nine gears 18 are herein illustrated, each adapted to be driven by the gear 17, nine different speeds are obtainable, but in this instance a further speed variation is obtained between the shaft 19 and what may be termed the work shaft or ultimately driven shaft 21 by providing loosely on the shaft 19 two gears 22 of different sizes, each adapted to be clutched to the shaft 19 by a clutch member 23 mounted on the latter, and each adapted to engage one of two gears 24 of different sizes keyed or otherwise secured to the power shaft 21.

It might be stated at this point that the gears 17 and 18 are not plain spur gears but their teeth are slightly inclined or beveled relative to the axis of their respective shafts.

Taking up now the mechanism by which the gear 17 is shifted so that it is possible to operatively engage it with any one of the gears 18, it will be observed by reference particularly to Fig. 2, that the gear 17 is carried by one element 25 of a two-part clutch, which element has a swivel connection with a ball 26 which is slidable along the shaft 16, which it will be observed is a splined shaft. This clutch element 25 has a conical socket 25ᵃ adapted to receive the conical portion 27ᵃ of a second clutch element 27 which is rotated by the splined shaft 16, and when the clutch elements 25 and 27 are moved together to operative position they are clutched together through the medium of clutch teeth 27ᵇ and since the clutch element 27 is driven by the shaft 16, the clutch element 25, and therefore the gear 17 likewise will be driven, but when the clutch elements are dis-engaged no rotative movement will be imparted to the clutch element 25 or gear 17, as the ball 26 will then simply rotate in the socket of the clutch element 25.

It will be observed that the gear 17 is at one end of the clutch element 25 and is displaced laterally some distance from the ball 26 and that by reason of the conical socket the clutch member 25 may be swung about the ball 26 as a center or axis so that the teeth of the gear will clear the gears 18.

Above and extending parallel to the inclined shaft 16 are two shafts 28 and 29, the former being a splined shaft and the latter a threaded shaft with a thread or spiral groove 29ᵃ. Mounted on these two shafts are two yokes 30 and 31, having oppositely disposed fingers or arms 30ᵃ and 31ᵃ, which engage respectively in grooves of the two clutch elements 25 and 27 so that when the yokes are shifted relative to the two shafts 28 and 29, the two clutch elements 25 and 27 will be moved lengthwise of the shaft 16.

The shaft 29 has a threaded connection with the yoke 30, this connection being accomplished by a pin 32 which is carried by the yoke 30 and engages in the thread or spiral groove of the shaft 29. The yoke 31 has no direct driving connection with either of the shafts 28 and 29, but the upper portion of this yoke is provided with a rotatable sleeve 33 mounted on the splined shaft 28 and movable through an opening or passageway 34 at the upper part of the yoke 30, this sleeve 33 which is held against endwise movement relative to the yoke 31 having a spiral thread or groove 33ᵃ which is engaged by a pin 35 of the yoke 30.

By reason of this construction when the splined shaft 28 is turned as by means of a hand wheel, not shown, which can be connected to the shaft 28 by bevel gearing 28ᵃ, shown at the upper right hand side of Fig. 1, the yoke 31 and clutch element 27 will be shifted toward or from the yoke 30 and clutch element 25, the greatest possible degree of separation being that shown in Fig. 2. It will also be apparent, particularly by reference to Fig. 2, that after the clutch elements have been separated, if the threaded or grooved shaft 29 is turned both yokes and both clutch elements will be shifted as a unit lengthwise of the shafts 16, 28 and 29, providing the gear 17 is lifted clear of the gears 18.

I provide as a part of this mechanism, provision for lifting the gear 17 clear of the gears 18 when the two clutch elements are separated in the manner above stated, and this comprises a pair of lifting arms 36 pivoted between their ends at points indicated at 37 on the yoke arms 30ᵃ, (see Fig. 3). At their lower ends these lifter arms 36 are provided with rollers 38 which engage the annular portion of the yoke element 25 below its center, and between the upper ends of these arms and the upper portion of the yoke element 30 there are springs 39 which at all times tend to rock the arms 36 so as to shift the rollers inwardly. When the two clutch elements 25 and 27 are clutched together and the gear 17 is in normal position engaging one of the gears 18, the rollers 38 engage beneath the center of the annular part of the clutch element 25 so that when the clutch element 27 is withdrawn from the clutch element 25, the action of these rollers 38 is to automatically swing the clutch element 25 on the ball 26 so that the gear 17 is lifted clear of the gear 18 which it previously engaged, this movement being permitted by reason of the conical socket 25ᵃ which immediately surrounds the shaft 16 and which extends divergingly outward from the ball 26.

It will be seen therefore, that when the operator desires to increase or decrease the speed ratio, that is to say, desires to increase or decrease the speed of the shaft 19 relative to the shaft 16, the gear 17 will be shifted from one gear 18 to another gear 18 of smaller or greater size, depending upon whether the speed of the shaft 19 is to be increased or decreased, and to do this the operator will first turn the shaft 28 and this through the action of the spirally grooved sleeve 33 on the stationary pin 35, will cause the clutch element 27 and yoke 31 to travel away from the clutch element 25 and yoke 30 until the pin 35 reaches the end of the spiral groove 33ᵃ of the sleeve 33. During this movement the clutch element 25 is automatically rocked by the lifting arm 26 to the position shown in Fig. 2, so as to lift the gear 17 out of engagement with the gear 18 which it previously engaged. Then the operator will rotate the shaft 29, and this will shift the clutch elements 25 and 27 and the yokes 30 and 31 as a unit along the three shafts 16, 28 and 29 until the gear 17 is positioned over the proper or previously selected gear 18. Then the operator turns the shaft 28 in the reverse direction to that in which he previously rotated it, and this movement shifts the yoke 31 toward the yoke 30 and brings the clutch member 27 again into driving engagement with the clutch element 25. As the conical nose 27ᵃ of the clutch element 27 moves into the conical socket 25ᵃ of the clutch element 25, it automatically swings the clutch element 25 downward so as to cause the gear 17 to be in proper driving relationship with the selected gear 18.

This movement, that is, the movement of the yoke 31 toward the yoke 30 and the bringing of the two clutch elements into locking or driving engagement, and the swinging of the gear 17 into engagement with the gear 18, performs an additional function, and that is, it automatically locks the grooved shaft 29 against movement so as to prevent accidental or intentional shifting of the gear 17 axially of the shaft 16 as long as it is in driving engagement with any gear 18. This automatic locking of the shaft 29 is accomplished by mechanism shown in Figs. 1, 3 and 5. This mechanism includes a locking pin 40 slidingly mounted in a socket of the yoke 30, and adapted to engage in any one of a number of properly spaced openings or sockets 29$^b$ provided in the spirally grooved shaft 29. A spring 41 surrounds this pin in the socket, and the tendency of this spring is to lift the pin out of the socket of the shaft 29. Additionally there is pivoted at 42 (see Fig. 5) on the yoke 30, a locking lever 43 whose inner end is positioned over the outer end of the locking pin 40. The lever extends in a lateral direction beyond the yoke 30 past the yoke 31 when the latter is close to the yoke 30. The yoke 31 is provided with a cam lug 44 which is so disposed that as the yoke 31 is shifted toward the yoke 30 during the movement which brings the two clutch members together and swings gear 17 into engagement with the selected gear 18, this cam lug engages and rocks the lever 43, causing its inner end to engage and force the inner beveled end of the locking pin 40 into one of the sockets or openings of the shaft 29. Likewise, when the yoke 31 is shifted away from the yoke 30, preparatory to shifting the gear 17 into engagement with some other gear 18, the cam lug moves out of engagement with the lever 43, whereupon the spring 41 lifts the pin 40 out of locking engagement with the shaft 29 so that the latter can be turned to move the gear 17 along the shaft 16 when the gear has been lifted clear of the gear 18 which it previously engaged. It will be understood that the sockets or openings 29$^b$ of the shaft 29 are so disposed that one of these openings will be directly opposite the end of the pin 40 when the gear 17 has been moved along the shaft 16 the right amount to cause it to properly engage one of the gears 18 when the gear 17 is swung downward to driving engagement therewith.

I have, during the course of the detailed description explained the function and operation of the several parts of the mechanism, and the operation of the mechanism as a whole will be understood without further description of the operation.

While I have shown one embodiment of the invention, I do not wish to be confined to the precise details or arrangements shown, as modifications may be made without departing from the spirit and scope of the invention as defined in the appended claims. Furthermore, while the shaft 16 is preferably the driving shaft, and the shaft 19 the driven shaft, and the mechanism has been so described, the mechanism would be as effective should the arrangement be reversed or changed to an extent necessary to make the shaft 19 with its gears 18 the driving part, and the shaft 16 with its gear 17 the driven part.

Having described my invention, I claim:

1. In a multiple speed drive mechanism, a pair of relatively fixed shafts one inclined with respect to the other and one being provided with a plurality of gears of different sizes and the other with a single gear adapted to have driving engagement with any one of the different sized first named gears, and means for engaging and disengaging the gears by causing a relative movement thereof transversely with respect to the relatively fixed shafts and for causing an axial relative movement thereof while disengaged, the second named shaft being rotatable with the gear which it carries, and a power transmitting means connected to one of said shafts.

2. In a multiple speed drive mechanism, a shaft having a plurality of gears of different sizes, a second shaft having a gear adapted to have driving engagement with any of said first-named gears, said last-named gear being normally held centrally on its shaft and having a mounting which permits it to be moved to a position eccentric with respect to the shaft and directly away from the first-named gears so as to clear the same and so that it can then be moved axially of its shaft.

3. In a multiple speed drive mechanism, a shaft having a plurality of gears, a second shaft having a single gear adapted to engage any one of said first-named gears, said single gear having a mounting on its shaft composed of relatively movable parts which normally hold said gear centrally with respect to its shaft and forms a driving engagement therewith, said parts when separated, permitting the gear to swing away from the first-named gears so that it can be moved axially along its shaft.

4. In a multiple speed drive mechanism, a shaft having a plurality of gears, a second shaft having a single gear adapted to engage any one of the first-named gears, means for holding said single gear centrally with respect to its shaft and in driving engagement therewith, said means comprising a pair of clutch elements one having driving engagement with the shaft.

5. In a multiple speed drive mechanism, a shaft having a plurality of gears, a second shaft having a single gear adapted to engage any one of the first-named gears, means for holding said single gear centrally with respect to its shaft and in driving engagement therewith, said means comprising a pair of clutch elements one having driving engagement with the shaft, and means for shifting said clutch elements into and out of engagement with one another.

6. In a multiple speed drive mechanism, a shaft having a plurality of gears, a second shaft having a single gear adapted to engage any one of the first-named gears, means for holding said single gear centrally with respect to its shaft and in driving engagement therewith, said means comprising a pair of clutch elements one having driving engagement with the shaft, and means for shifting both clutch elements and said single gear lengthwise of the second-named shaft when the clutch elements are disengaged.

7. In a multiple speed drive mechanism, a shaft having a plurality of gears, a second shaft having a gear adapted to have driving engagement with any one of the first-named gears, a member carrying said second-named gear and having a mounting on the second shaft which permits the gear thereon to be swung transversely of the second-named shaft, and a second member adapted to engage the first to hold said gear centrally on its shaft.

8. In a multiple speed drive mechanism, a shaft having a plurality of gears, a second shaft, a single gear thereon adapted to engage any of the first-named gears, means forming driving engagement between said single gear and the second shaft comprising two members movable into and out of engagement with one another, one carrying said single gear and capable of transverse motion on the shaft when said members are separated, means for moving said members relatively, and means for moving one of said members and the gear carried by it so as to swing the gear away from the first-named gears when said members are separated.

9. In a multiple speed drive mechanism, a shaft having a plurality of gears, a second shaft, a single gear thereon adapted to engage any of the first-named gears, means forming driving engagement between said single gear and the second shaft comprising two members movable into and out of engagement with one another, one carrying said single gear and capable of rocking motion on the shaft, means for moving said members relatively, and means for moving one of said members and the gear carried by it so as to swing the gear away from the first-named gears while said members are being separated.

10. In a multiple speed drive mechanism, a shaft having a plurality of gears, a second shaft, a single gear thereon adapted to engage any one of the first-named gears, means comprising two relatively movable members for holding said single gear centrally on its shaft and for forming driving engagement therewith, one of said members carrying said single gear and capable of movement on the second shaft which swings the single gear away from the first-named gears, means for shifting said members and said single gear along said second shaft when said members are separated, and means for preventing the last-mentioned movement when said gear is in engagement with one of the first-named gears.

11. In a multiple speed drive mechanism, a shaft having a plurality of gears, a second shaft, a single gear thereon adapted to engage any one of the first-named gears, means comprising two relatively movable members for holding said single gear centrally on its shaft and for forming driving engagement therewith, one of said members carrying said single gear and capable of movement on the second shaft which swings the single gear away from the first-named gears, means for shifting said members and said single gear along said second shaft when said members are separated, and means for moving said members relatively.

12. In a multiple speed drive mechanism, a shaft having a plurality of gears of different sizes, a second shaft having a single gear adapted to engage any one of the first-named gears, said single gear having a mounting on the second shaft composed of two relatively movable clutch members adapted to be shifted into and out of engagement with each other, one of said members carrying said single gear and capable of movement on the second shaft so as to shift said single gear transversely with respect to its shaft, a third shaft for shifting said single gear and the two clutch members axially of said second shaft, and means for preventing movement of said third shaft except when said clutch members are dis-engaged and the single gear is free of the first-named gears.

13. In a multiple speed drive mechanism, a shaft having a plurality of gears of different sizes, a second shaft having a single gear adapted to engage any one of the first-named gears, said single gear having a mounting on the second shaft composed of two relatively movable clutch members one carrying the gear and the second serving to hold the same centrally on the second shaft and to form driving engagement therewith, said gear being movable transversely of the second shaft when said clutch members are dis-engaged, means comprising a third shaft for shifting said clutch members relatively, and means comprising a fourth shaft for shifting said clutch members and said single gear along said second shaft.

14. In a multiple speed drive mechanism, a shaft having a plurality of gears of different sizes, a second shaft having a single gear adapted to engage any one of the first-named gears, said single gear having a mounting on the second shaft composed of two relatively movable clutch members, one carrying the gear and the second serving to hold the same centrally on the second shaft and to form driving engagement therewith, said gear being movable transversely of the second shaft when said clutch members are dis-engaged, means for shifting said clutch members relatively, means comprising a shaft for shifting said clutch members and said single gear along said second shaft, and means for shifting said single gear transversely of said second shaft when the clutch members are dis-engaged.

15. In a multiple speed drive mechanism, a shaft having a plurality of gears of different sizes, a second shaft having a single gear adapted to engage any one of the first-named gears, said single gear having a mounting on the second shaft composed of two relatively movable members, one carrying the gear and the second serving to hold the same centrally on the second shaft and to form driving engagement therewith, said gear being movable transversely of the second shaft when said members are dis-engaged, means for shifting said members relatively, means comprising a shaft for shifting said members and said single gear along said second shaft, and means for locking said last-named shaft against movement when said members are in engagement.

In testimony whereof, I hereunto affix my signature.

DOMENICO IACOBACCI.